April 22, 1958 A. PHILLIPS ET AL 2,831,254
LENGTH MEASURING DEVICE
Filed May 23, 1955 2 Sheets-Sheet 1
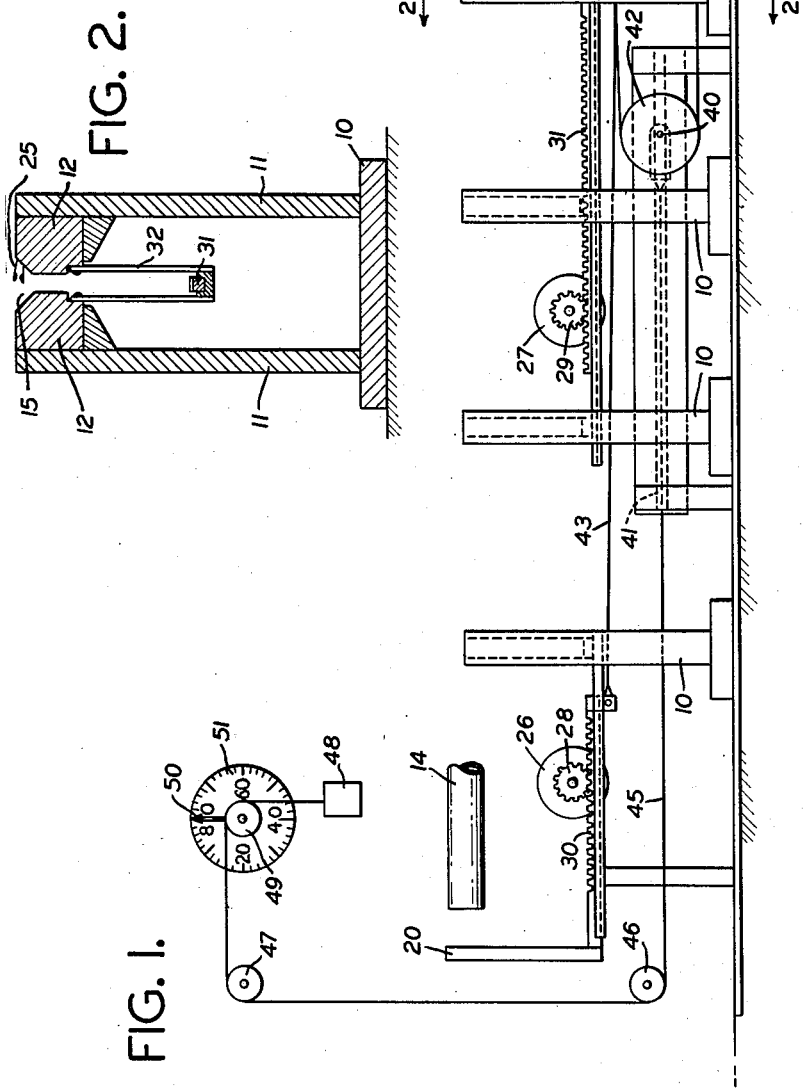

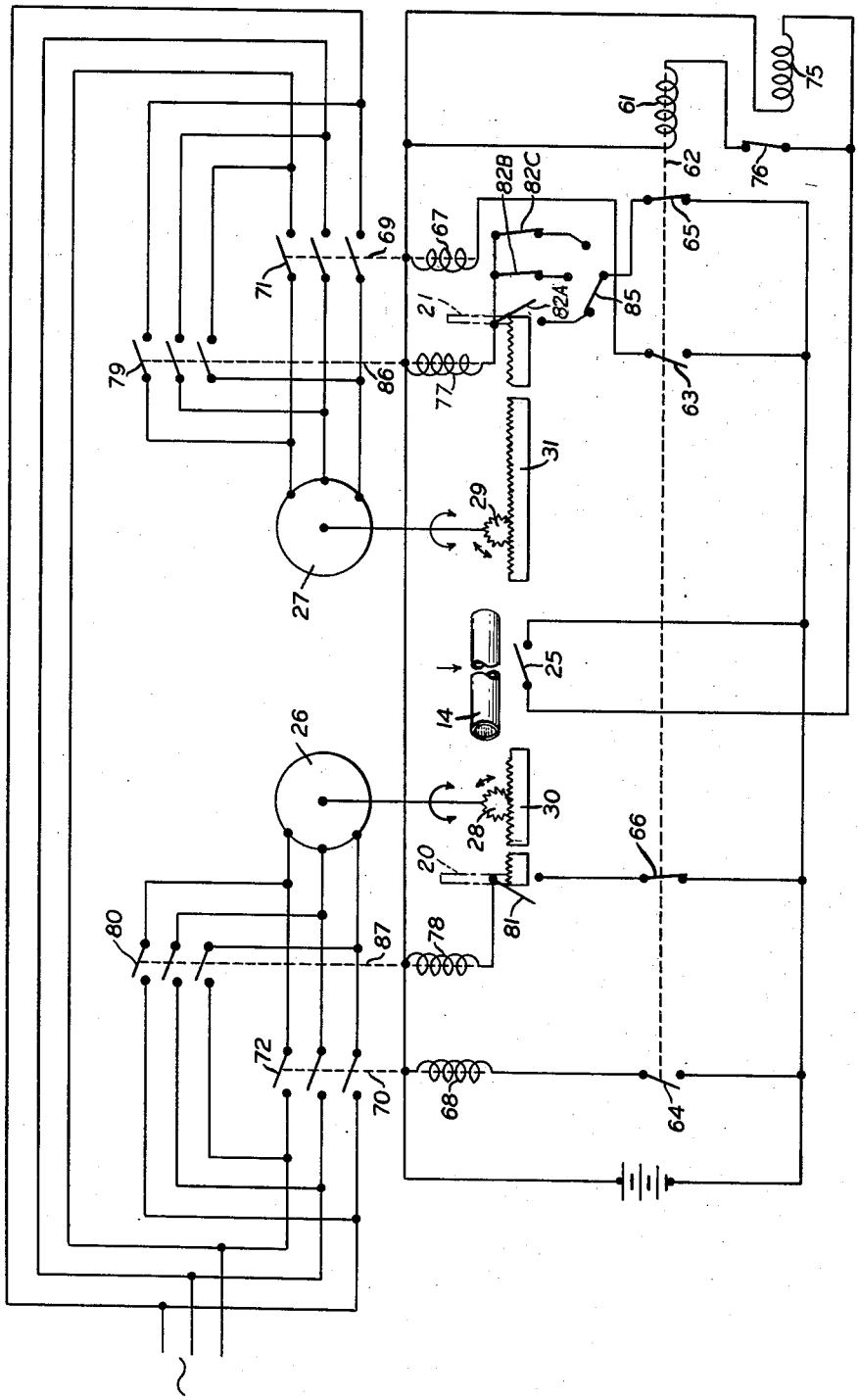

United States Patent Office 2,831,254
Patented Apr. 22, 1958

2,831,254
LENGTH MEASURING DEVICE

Adrian Phillips, Bronx, and Leo Robbins, Brooklyn, N. Y., assignors, by mesne assignments, to Baldwin-Lima-Hamilton Corporation, Philadelphia, Pa., a corporation of Pennsylvania Application May 23, 1955, Serial No. 510,442

8 Claims. (Cl. 33—147)

This invention relates to means for measuring the length of objects, particularly automatically measuring the length of elongated objects such as pipes, tubes, rods, structural members and the like. In devices heretofore employed it has been customary to shift the object until one end engaged a fixed stop, the length then being determined by moving another member into contact with the other end of the object. This necessitated handling of the object which, in the case of large tubes and pipes, frequently weighed several tons, in order to position it properly for the measuring operation. Automatic feeding of the objects into measuring position, and automatic measuring of the object would thus be difficult and relatively slow with such equipment. It is therefore one of the principal objects of this invention to provide a length measuring device which will not require adjustment of the object longitudinally into a fixed, predetermined position as a condition precedent for length measurement, but which rather permits the object to remain in any longitudinal position to which it has been delivered in the measuring device.

Further objects and advantages of this invention will become apparent in the following detailed description thereof.

In the accompanying drawing,

Fig. 1 is a side elevation of a length measuring device embodying one form of this invention.

Fig. 2 is a section taken on the line 2—2 of Fig. 1.

Fig. 3 is the electric wiring diagram of the automatic control system for controlling the length measuring device in Fig. 1.

Referring to the drawings, there is shown a series of supports 10 each comprising a pair of spaced stanchions 11 to which are fixed spaced supporting blocks 12 providing a groove 15 for receiving the object 14 whose length is to be measured. The object may be fed to the supporting blocks 12 automatically if desired and, as will become apparent, the object does not have to be positioned in any fixed or predetermined position longitudinally of its axis. In other words the object will be permitted to rest in any position in which it may have been fed onto the supporting blocks 12. Successive objects may therefore occupy different positions longitudinally in the measuring device.

In spite of the fact that one end of the object is not, as heretofore, adjusted so that one end engages a fixed stop, the present device measures the length of the object, and if desired does so automatically. For this purpose there are provided a pair of measuring members or fingers 20, 21, but whereas heretofore one of these fingers would have been fixed in position, by the present invention both fingers are movable into engagement with the respective ends of the object to be measured. Preferably such movement of fingers 20 and 21 is accomplished automatically, as, for instance, by causing the weight of the object on supporting blocks 12 to close switches 25 which energize torque motors 26, 27 to drive pinions 28, 29 which engage racks 30, 31 upon which fingers 20, 21 are mounted. The racks are guided by a structure 32 suspended from blocks 12. As the object descends upon the support blocks 12 the fingers are thus caused to move until they engage the ends of the object.

To indicate the length of the object, means are provided which are responsive to the sum of movements of the fingers. For this purpose there is provided a floating pivot in the form of an axle or shaft 40 movable linearly in a slot 41. The axle has fixed thereto a pulley 42 over which operates a cable 43 one end of which is connected to finger 21. The cable 43 extends around a fixed pulley 44, and is connected to finger 20 by way of rack 30. The cable 43 is held taut by a cable 45 connected to axle 40 and extending over pulleys 46, 47, 49 to a counterweight 48. The weight 48 therefore tends to move axle 40 toward the left in the drawing. For the sake of clarity, the portions of cable 43 connected to finger 21 and rack 30 are shown slightly inclined in Fig. 1, but these cable portions will actually be positioned in a common horizontal plane tangential to pulleys 42, 44 and parallel to the path of movement of axle 40 to obtain precise measurements.

It will be apparent that if finger 20 moves toward the right (i. e., toward one end of the object to be measured), this movement will tend to provide slack in cable 43 which will permit the weight 48 to move the axle 40 to the left a distance which is a function of the degree of movement of finger 20 to the right. Similarly, movement of finger 21 to the left (i. e., toward the other end of the object to be measured) tends to provide slack in cable 43 which will again permit the weight 48 to move axle 40 to the left a distance which is a function of the degree of movement of finger 21 to the left. Thus the arrangement whereby the ends of cable 43 extend in opposite directions from floating axle 40 to the fingers 20, 21, permits the axle 40 to be moved a distance which is a function of the sum of the movements of the fingers. The length of the object being measured is equal to the initial distance between the fingers 20, 21 minus the sum of the movements of the fingers to the ends of the object. Therefore a pointer 50, operating over a scale 51, is connected to pulley 49 so that it will be moved by cable 45. The pointer will normally indicate the maximum initial distance between the fingers before they have begun their movement toward the ends of the object. The pointer will rotate as a function of the degree of movement of axle 40 to the left, so that the shorter the object the greater will be the degree of movement of pointer 50, and the smaller will be the indication of the pointer on the scale. For example, the pointer will move from a maximum graduation 80 to graduation 60 if the object is 60 ft. long. This method of indicating the sum of the movements of the fingers towards the ends of the object is merely illustrative, and other indicating means may be employed.

The initial position of finger 21 may be adjusted along rack 31 for articles of various length ranges to reduce the amount of idle motion of the fingers. Since cable 43 is directly connected to finger 21, such adjustment will result in movement of the floating axle 40 which will automatically result in the pointer 50 assuming a starting position on scale 51 for measuring a smaller maximum length.

Referring to Fig. 3, there is disclosed the electrical system whereby the length measuring device disclosed hereinbefore operates substantially automatically. The object 14 whose length is to be measured is caused to close one or more switches 25, which, as mentioned hereinbefore, may be located on the supporting blocks 12. Closing of switch means 25 energizes an electromagnet 61 whose core 62 closes two normally open switches 63 and 64 and opens two normally closed switches 65 and 66. Closing of switches 63 and 64 energizes forward starter magnets 67 and 68 to actuate their cores 69 and 70 to close sets of switches 71 and 72 which will energize torque motors 26, 27 in a direction (here called forward) to drive fingers 20, 21 through pinions 28, 29 and racks 30, 31 toward the ends of object 14. When the fingers contact the ends of the object, torque motors 26, 27 will stop rotating but will continue to urge the fingers against the object.

When switch 25 is closed, it also energizes a time delay relay 75 which, after a predetermined time sufficient to permit the measure of length to be completed, will open normally closed contacts 76 to deenergize magnet 61. This will cause switches 63 and 64 to open and deenergize the forward starters through motors 26 and 27, and will cause switches 65 and 66 to close. This will energize reverse starter magnets 77 and 78 to actuate their cores 86, 87 to close sets of switches 79 and 80 which will reverse the direction of operation of motors 26, 27. Racks 30 and 31 will be moved outwardly away from the ends of object 14, and will continue to move outwardly until they operate limit switches 81 and 82A, 82B, 82C to break the reverse circuits through the motors. A selector switch 85 cooperates with the limit switches 82A, 82B, 82C to render one of them effective depending upon the range of length of objects being measured, the switches 82A, 82B, 82C being positioned at different distances spaced from switch 81. It will be clear that if the spaced limit switches 82A, 82B, 82C and selector switch 85 are used, it is not necessary to adjust the position of finger 21 along rack 31.

The object 14 may now be removed, which will cause switch means 25 to return to their normal, open position deenergizing time delay relay 75. The parts are then in position for commencing another cycle by placing the next object 14 on the supports where the switch means 25 can be closed by the object.

Having described our invention, what we claim and desire to secure by Letters Patent is:

1. A device for measuring the length of an object along an axis thereof, comprising means for supporting the object, a pair of measuring members in the form of fingers movable along said axis toward and away from the respective ends of the object, means actuated by said fingers as a function of the sum of the movements of said fingers from initial predetermined positions into engagement with the ends of the object, said actuated means including a floating axle and connections from said fingers to said axle, and an indicating device operated by said actuated means.

2. A device as specified in claim 1, in which the respective fingers are connected to said axle in opposite directions.

3. A device as specified in claim 2, in which a pulley is fixed to the floating axle, and a cable extends around said pulley, the ends of the cable being connected to the respective fingers.

4. A device as specified in claim 3, including means tending to move the axle in a given direction, and means whereby movements of the fingers toward the object tend to provide slack in said cable to permit said preceding means to move the axle in said given direction.

5. A device for measuring the length of an object along an axis thereof, comprising means for supporting the object, a pair of measuring members movable along said axis toward and away from the respective ends of the object, means actuated by said members as a function of the sum of the movements of said members from initial predetermined positions into engagement with the ends of the object, an indicating device operated by said actuated means, actuating means for moving said measuring members toward and away from the ends of the object, control means responsive to movement of the object into measuring position, and means whereby said control means causes said actuating means to move the measuring members toward the ends of the object.

6. A device as specified in claim 5, in which the actuating means for moving the measuring members are motors, and the means responsive to movement of the object into measuring position is a switch for controlling the motors.

7. A device as specified in claim 6, including means for reversing the motors to move the measuring members away from the object and toward initial positions, and means for rendering the reversing means effective a predetermined time after the motors have been rendered effective to move the measuring members toward the object.

8. A device as specified in claim 7, including limit switches for rendering the motors ineffective, and means for operating the limit switches when the measuring members reach their initial positions.

References Cited in the file of this patent

UNITED STATES PATENTS

| 1,683,909 | Mavis et al. | Sept. 11, 1928 |
| 1,758,268 | Wagner | May 13, 1930 |
| 2,691,826 | Breisch | Oct. 19, 1954 |

FOREIGN PATENTS

| 1,070,214 | France | Feb. 17, 1954 |
| 491,285 | Italy | Feb. 26, 1954 |